United States Patent
Tseng et al.

(10) Patent No.: US 8,825,292 B2
(45) Date of Patent: Sep. 2, 2014

(54) SUSPENSION CONTROL SYSTEM TO FACILITATE WHEEL MOTIONS DURING PARKING

(71) Applicant: Ford Global Technologies, LLC, Dearborn, MI (US)

(72) Inventors: Eric H. Tseng, Canton, MI (US); Davor Hrovat, Ann Arbor, MI (US); Jianbo Lu, Livonia, MI (US); Mitch McConnell, Temperance, MI (US); Matthias Dehmel, Pulheim (DE); Michael Seemann, Cologne (DE); Fredrick V. Owens, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/738,150

(22) Filed: Jan. 10, 2013

(65) Prior Publication Data

US 2014/0195114 A1    Jul. 10, 2014

(51) Int. Cl.
*B62D 61/12*    (2006.01)
*B60G 17/015*    (2006.01)

(52) U.S. Cl.
CPC .................................. *B60G 17/015* (2013.01)
USPC ......................................... 701/37; 280/5.514

(58) Field of Classification Search
USPC ......................................... 701/37; 28/5.514
See application file for complete search history.

(56) References Cited

U.S. PATENT DOCUMENTS

| 7,389,994 | B2 | 6/2008 | Trudeau et al. ............ 280/6.153 |
| 2007/0152427 | A1* | 7/2007 | Olsen ............................. 280/649 |
| 2009/0177346 | A1 | 7/2009 | Hac ................................. 701/29 |
| 2010/0152969 | A1 | 6/2010 | Li et al. ........................... 701/37 |

* cited by examiner

*Primary Examiner* — Mary Cheung
*Assistant Examiner* — Yuen Wong
(74) *Attorney, Agent, or Firm* — L.C. Begin & Associates, PLLC

(57) ABSTRACT

A method for controlling a vehicle includes the step of determining if a curb parking operation is feasible for the vehicle. If a curb parking operation is deemed infeasible, an operator of the vehicle is notified that curb parking is infeasible. If a curb parking operation is deemed feasible, actuatable elements of the vehicle are controlled to facilitate the curb parking operation.

20 Claims, 5 Drawing Sheets

SUSPENSION CONTROL SYSTEM TO FACILITATE WHEEL MOTIONS DURING PARKING

TECHNICAL FIELD

The present invention generally relates to a vehicle suspension system and, more particularly, to an active suspension system that uses various inputs to facilitate parking of at least a portion of a vehicle on a curb.

BACKGROUND OF THE INVENTION

On narrow streets (as found, for example, in some older European cities), it may be necessary to park with a portion of the vehicle residing on the street and a portion of the vehicle residing on the curb. However, the curb parking operation may increase the risk of damage to wheels and tires, and also may accelerate tire wear. Thus, a need exists for systems and methods which facilitate curb parking while minimizing or reducing the risk of wheel and tire damage.

SUMMARY OF THE INVENTION

In one aspect of the embodiments of the present invention, a method for controlling a vehicle is provided. The method includes a step of determining if a curb parking operation is feasible for the vehicle. If a curb parking operation is deemed infeasible, an operator of the vehicle is notified that curb parking is infeasible. If a curb parking operation is deemed feasible, actuatable elements of the vehicle are controlled to facilitate curb parking.

In another aspect of the embodiments of the present invention, a system is provided for controlling a vehicle. The system includes indicating means for indicating when a predetermined angle between a vertical plane passing through a center of a vehicle wheel and extending in the direction in which the wheel is pointing, and a line defining a curb adjacent the wheel, has been achieved.

DETAILED DESCRIPTION

Figure 1:
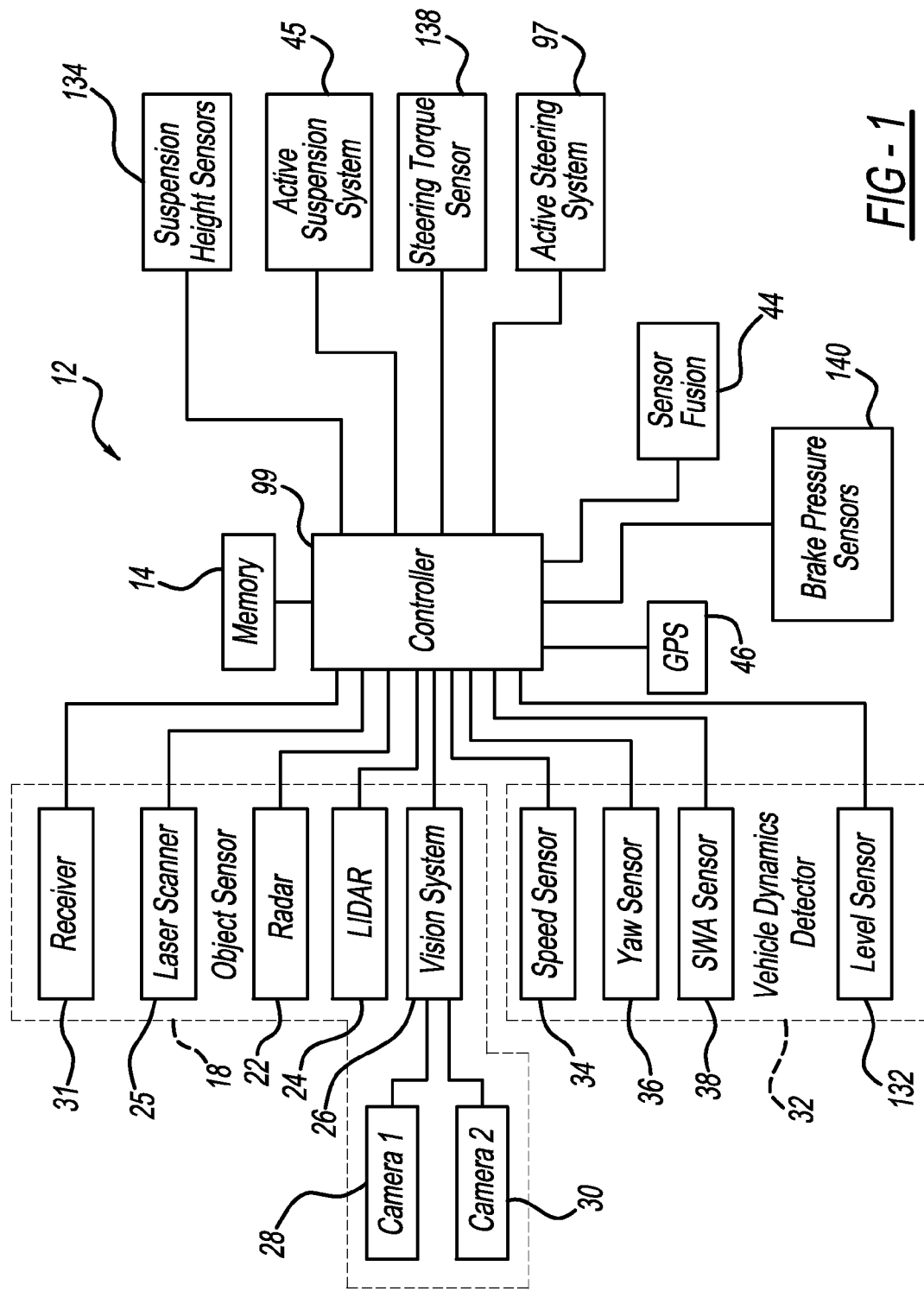
FIG. 1 is a schematic view of a vehicle control system suitable for controlling an active suspension system in accordance with the principles of the present invention.

FIG. 1 is a schematic diagram of a vehicle control system 12 configured for controlling an active suspension system 45 in accordance with the principles of the present invention. Control system 12 includes an array of vehicle sensors designed to monitor various vehicle parameters and environmental conditions external to the vehicle. The sensor array includes various types of sensors operatively coupled to one or more system control modules so as to enable transmission of the sensor inputs to the control module(s). The sensor array may include individual sensors or groups of associated sensors (such as radar, lidar, laser scanner, or vision/camera systems) for detecting aspects of the vehicle environment (for example, the distance of a portion of the vehicle from various external objects).

In one embodiment, the sensor array incorporate a vision system 26 and radar sensors 22, lidar sensors 24, or laser scanners 25 to obtain remote information about potential obstacles in the path of the vehicle or near the vehicle 101. The sensor array also provides host vehicle dynamics information. One or more of the object detection systems may be used in a sensor fusion stage executed by a sensor fusion means 44, which may be included to determine the degree of usefulness of each measured signal input such that the pre-crash sensing controller produces a weighted output from the combination of signals.

In one embodiment, a remote object sensor 18 is coupled to a central controller 99 (described below). Remote object sensor 18 generates an object signal in the presence of an object within its field of view. Remote object sensor 18 may include one or a number of combinations of sensors including a radar 22, a lidar 24, and a vision system 26.

Vision system 26 may be comprised of one or more cameras, CCD, or CMOS type devices. As illustrated, a first camera 28 and a second camera 30 may form vision system 26. Both radar 22 and lidar 24 are capable of sensing the presence and the distance of an object from the vehicle. The camera system is also capable of detecting the distance of an object from the vehicle. Alternatively, radar 22 or lidar 24 may be used to detect an object within a detection zone and vision system 26 may be used to confirm the presence of the object within the detection zone.

In another embodiment of the present invention, a vision system including cameras 1 and 2 alone may use established triangulation techniques to determine the presence of an object, the distance of the object from the vehicle and the velocity of the relative to the object, as well as the object's size that may include area, height or width. In one particular embodiment, the cameras are high-speed cameras operating in excess of 50 Hz. A suitable example is a CMOS-based high dynamic range camera cable of operating under widely differing lighting and contrast conditions.

A vehicle dynamics detector 32 is also coupled to controller 99. The vehicle dynamics detector 32 generates a signal or signals indicative of the dynamic conditions of the vehicle. The vehicle dynamics detector 32 may comprise various numbers or combinations of sensors but in one embodiment includes a wheel speed sensor 34, a yaw rate sensor 36, level sensors 132 (to provide data indicating whether or not the vehicle is level), and a steering wheel angle sensor 38. In addition, longitudinal acceleration sensor (not shown) may also be included in the vehicle dynamics detector 32. The longitudinal acceleration sensor can provide controller 99 some indication as to the occupant driving characteristics such as braking or deceleration. The vehicle dynamic conditions may also include vehicle bumper height from the suspension height sensor. Various sensors of the vehicle dynamics detector 32 may be incorporated into a known or suitable inertial measurement unit (IMU) (not shown).

Wheel speed sensor 34 may be one of a variety of speed sensors known to those skilled in the art. For example, a suitable speed sensor may include a sensor element at every wheel that is averaged by controller 99. Preferably, controller translates the wheel speeds into the speed of the vehicle. Suitable type of speed sensors 34 may include, for example, toothed wheel sensors such as those employed on anti-lock brake systems.

Yaw rate sensor 36 can provide the yaw rate of the vehicle about the center of gravity of the vehicle. The yaw rate measures the rotational tendency of the vehicle about an axis normal to the surface of the road. Although yaw rate sensor can be located at the center of gravity, those skilled in the art will recognize that the yaw rate sensor may be located in various locations of the vehicle and translated back to the center of gravity either through calculations at the yaw rate sensor 36 or through calculations within controller 99 in a known manner.

Steering wheel angle sensor 38 provides a steering wheel angle signal to controller 99. The steering wheel angle signal corresponds to the steering wheel angle of the hand wheel of the automotive vehicle. The yaw rate sensor 36 and the vehicle speed sensor 34 or the steering wheel angle sensor 38 alone, or the above sensors in combination, may be used to indicate the kinematics of the vehicle.

A global positioning system (GPS) 46 may also be coupled to controller 99. GPS 46 system generates a vehicle position of the vehicle in response to satellites to aid in vehicle location and navigation.

Additional sensors include (or may include) suspension height sensors 134, steering torque sensors 138, brake pressure sensors 140, tire pressure sensors 142, and other types of sensors as required. Groups of associated sensors (for example, a road condition sensor suite including sensors tasked with acquiring data relating to the condition of road surfaces near the vehicle) (not shown) may include multiple different types of sensors, depending on the tasks the suite is required to perform in a given control system.

The control system 12 also may include one or more control modules (not shown) operatively coupled to associated sensors (or groups of sensors), to other control modules, and/or to other elements of the control system. Examples of such control modules include a central controller 99 (for example, a vehicle dynamics control module (VDCM) or, similar main controller, and control modules incorporated into various vehicle subsystems. Controller 99 may be a microprocessor-based controller that is coupled to a memory 14. Memory 14 is illustrated as component separate from controller 12. However, those skilled in the art will recognize that memory 14 may be incorporated into controller 12. Memory 14 may comprise various types of memory including read only memory, random access memory, electrically erasable programmable read only memory, and keep alive memory. Memory 14 may be used to store various control routines, control system thresholds and operational parameters, in a manner known in the art.

In the embodiments disclosed herein, controller 99 may include any suitable combination of hardware and software and is not limited to the schematic depiction shown in FIG. 1. This includes, but is not limited to, a suspension control module that is a stand-alone module (as previously described) and one that is integrated or combined with some other vehicle electronic module (e.g., a chassis control module). It should be appreciated that while the preceding descriptions are directed to hydraulic and a pneumatic (or air) suspension embodiments, other types of active suspension systems could also be used.

In a manner known in the art, the controller 99 receive inputs from various sensors, processes these inputs in accordance with a stored control logic or control routine, and generates control signals which are transmitted to various actuatable control system elements or to suitable subordinate or lower level control modules which control such actuatable elements (for example, elements of an active suspension system (generally designated 45 in FIG. 1). As used herein, the term "actuatable elements" refers to elements of the vehicle which are adjustable responsive to inputs from a vehicle operator and/or to commands from a vehicle controller or other suitable source, to affect various vehicle characteristics and parameters in a controlled and desired manner. Some examples of actuatable elements are elements of an active suspension system which are adjustable to control suspension travel, suspension height, suspension damping force, and suspension stiffness. If desired, various specific control functions may be performed by dedicated control modules, or these control functions may be performed by one or more dedicated sub-routines or modules integrated into a more centralized controller, such as the controller. For example, control of the active suspension system may be performed by a dedicated suspension control module instead of by the controller. The control system 12 may also include various actuatable individual elements and elements of various sub-systems affecting characteristics such as ride performance, handling characteristics, and various safety, driver assistance, and passenger warning features, for example (not shown).

The embodiments of the present invention focus primarily on the control of the active suspension system, where such characteristics as suspension travel, suspension height, suspension damping-force, and suspension stiffness, are adjustable in real time with actuation response times low enough to enable suspension system control responsive to vehicle and external conditions encountered during a parking maneuver. The suspension actuations are adaptive to vehicle and external conditions determined using the aforementioned sensing systems.

Embodiments of the active suspension system and control method described herein can be used to control the heights of portions of the vehicle during a parking maneuver requiring that a portion of the vehicle be parked upon a street curb (i.e., a curb parking operation). In the exemplary embodiments shown herein, active suspension system 45 receives information from one or more sources (such as controller 99 or a dedicated active suspension control module) and uses that information to actively and independently control the vehicle height at each individual wheel, along with other pertinent parameters, during a parking maneuver. The following description relates to an active suspension system capable of raising and lowering one or more portions of the vehicle independently from other portions of the vehicle, and capable of adjusting the damping and spring characteristics of the suspension at each individual wheel, all responsive to control signals received from a controller or sensor. Stated another way, the contemplated active suspension systems include, for example, active suspension systems incorporating hydraulic, electrical, and/or mechanical devices, as well as active suspension systems that control the vehicle height on an individual corner basis (i.e., four corner independently controlled vehicle heights), on an axle-by-axle basis (i.e., front axle and rear axle vehicle heights), or a single vehicle height for the entire vehicle. Embodiments of the active suspension system 12 described herein could be used with tractor trailers, commercial and non-commercial trucks, recreational vehicles (RVs), sports utility vehicles (SUVs), cross-over vehicles, passenger cars, as well as any other motorized vehicle.

Active suspension system 45 may also be directly connected to any of a variety of sensors, devices, components, modules, and other input sources located throughout the vehicle. These include speed sensors, longitudinal and lateral acceleration sensors, laser, radar, lidar and ultrasonic sensors, cruise control modules, brake modules, fuel management systems, vision systems, navigation systems, telematics units, as well as any other suitable input source that can provide information pertinent to the operation of active suspension system 45.

It should be appreciated that the various input sources mentioned above can be embodied in software or hardware, they can be stand-alone devices or they can be integrated into other devices such as vehicle electronic modules. In addition, as well as being connectible to controller 99, to a dedicated active suspension controller (not shown) and/or directly elements of the active suspension system, the input sources can be connected via a communications bus or the like, to cite a few possibilities.

As known in the art, an active suspension can be used to improve ride by adjusting suspension damping and/or spring rigidity characteristics, responsive to inputs from the VDCM 99 or other vehicle control modules. Thus, the embodiments shown in FIGS. 2 and 3 can be viewed as representations of a single vehicle wheel movable in a vertical direction.

Figure 2:
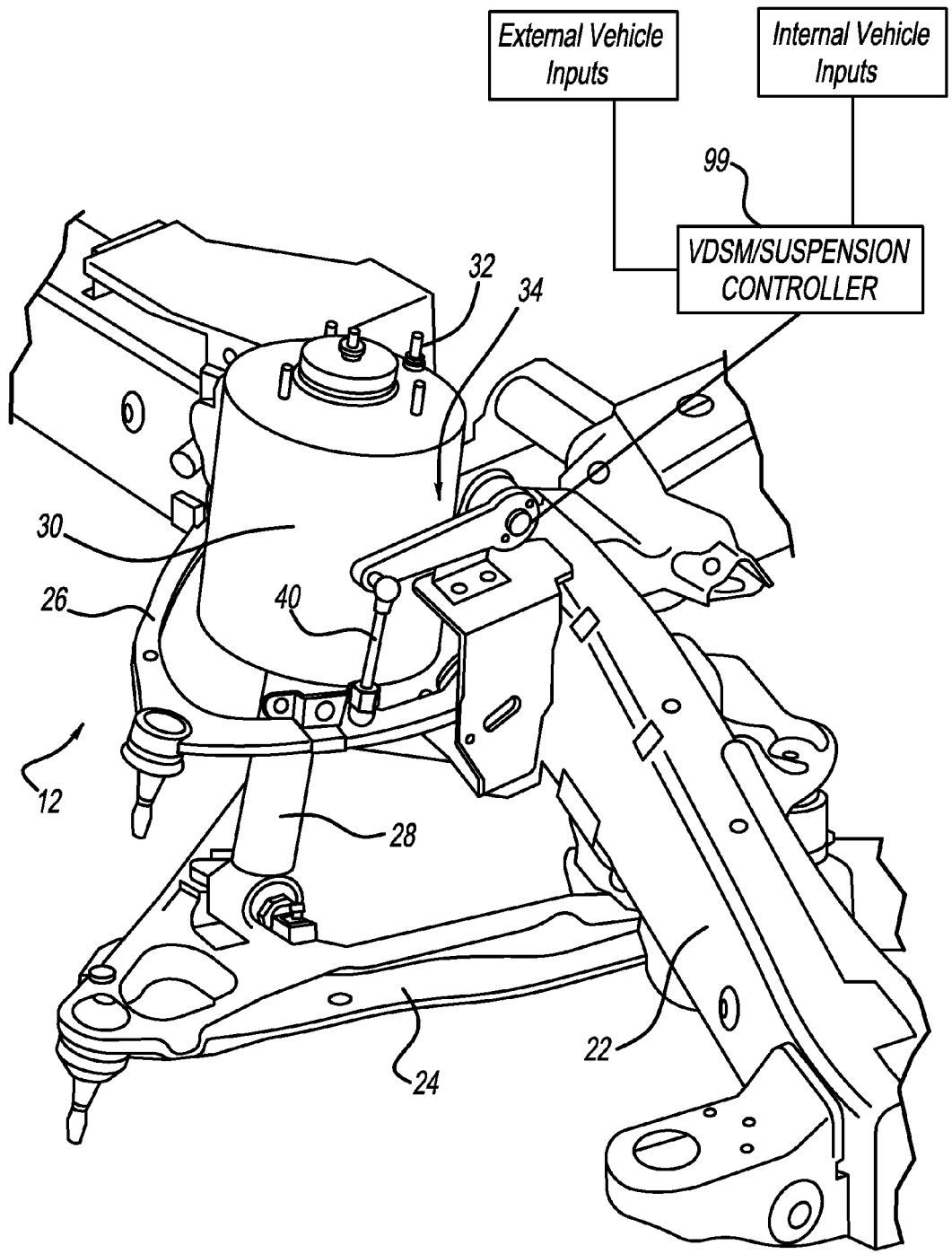
FIG. 2 is a perspective and schematic view of a portion of one embodiment of an active suspension system controllable in accordance with the principles of the present invention.

FIG. 2 is a schematic diagram of one wheel of a vehicle incorporating one embodiment of an active suspension system which may be controlled in accordance with the principles of the present invention. In this particular embodiment, active suspension system 12 includes a VDCM or a dedicated suspension control module 99, a frame or body portion 22 (the sprung mass), lower and upper control arms 24, 26 (the unsprung mass), a shock absorber or damper 28, an air spring 30, an air fitting (not shown), and a vehicle height sensor 34. Vehicle height sensor 34 is coupled to the VDCM or suspension controller 99 and can measure the vehicle height by monitoring the position of upper control arm 26, which moves in unison with lower control arm 24. In one embodiment, vehicle height sensor 34 includes a Hall-effect element and a mechanical link 40 and translates linear movement of the link, which is caused by movement in upper control arm 26, into rotational movement of the sensor. Other types of vehicle height sensors could be used, as the Hall-effect embodiment is only one example.

In order to make changes to the vehicle height, suspension control module 99 controls an air compressor (not shown) whose output is in fluid communication with the air fitting (not shown) and air spring 30. In the embodiment shown in FIG. 2, as the air volume in air spring 30 increases and decreases, no too does an axial extension of the air spring. By this means, air spring 30 and damper 28 (or any other suitable air-driven or fluid driven actuator) controls the distance between lower control arm 24 (unsprung mass) and body portion 22 (sprung mass), which in turn controls the vehicle height at the associated corner of the vehicle.

Figure 3:
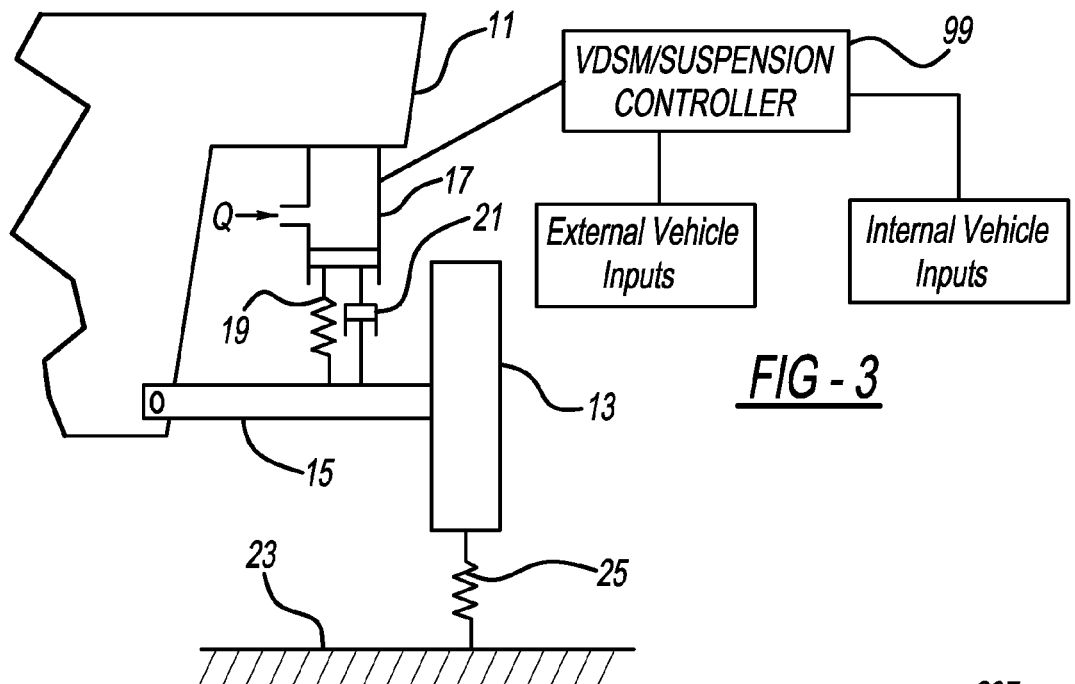
FIG. 3 is a perspective and schematic view of a portion another embodiment of an active suspension system controllable in accordance with the principles of the present invention.

FIG. 3 is a schematic diagram of one wheel of a vehicle incorporating another, hydraulically-actuated embodiment of an active suspension system which may be controlled in accordance with the principles of the present invention. In this representation, the mass of the vehicle's body is represented by the sprung mass 11. The wheel, represented by the unsprung mass 13, is attached to the vehicle body 11 by a control arm 15. The body 11 is supported above the unsprung wheel mass 13 by an active suspension system including control arm 15, a spring 19, a damper 21, and a volume of hydraulic fluid 17 which acts in series with spring 19 and damper 21. The controller 99 or another suitable suspension controller controls a fluid flow Q into or out of an actuator 17 (for example, a hydraulic actuator), whereby the suspension forces and the height of portions of the vehicle can be controlled. The wheel's unsprung mass 13 is supported by the road surface 23, the tire deflection being represented in FIG. 32 by the spring 25. VDCM or suspension control module 99 provides control commands to the illustrated portion of the suspension, in accordance with principles known in the art.

It will be appreciated that elements and actuators of the active suspension system and any systems or actuators responsible for vehicle height control (if separate from the suspension system) may be hydraulically, pneumatically, electrically or otherwise actuatable, according to factors such as response times required of the particular actuator or system, the levels of forces required from the particular actuator or system, and other pertinent requirements.

The term "actuator" broadly refers to any type of suspension component—pneumatic, hydraulic, mechanical, electrical or otherwise—that can be used to raise and/or lower the height of a vehicle. The term 'unsprung mass' generally refers to the portion of the vehicle's mass that is suspended below the suspension system (this generally includes the wheels, wheel bearings, brake rotors control arms, etc.). And the term 'sprung mass' generally refers to the portion of the vehicle's mass that is supported above the suspension system (this generally includes the body, frame, internal components, etc.).

Vehicle height and level settings are hereafter collectively referred to as "vehicle height". It should be appreciated that actual vehicle height settings may vary and that the systems and methods described herein can be used with any type of vehicle suspension system that is capable of controlling, adjusting, or manipulating a vehicle height, and are not limited to the particular embodiments provided here for purposes of explanation.

The term "internal vehicle input" broadly includes any input that is provided by a vehicle-mounted sensor, device, component, module, etc., and that pertains to one or more conditions occurring in the condition of the vehicle itself. Some examples of internal vehicle inputs include: a vehicle speed, a vehicle acceleration (e.g., lateral or longitudinal acceleration), a steering wheel angle, vehicle pitch, roll, or yaw information received from the IMU, a transmission or gear setting (e.g., park, neutral, drive, reverse, etc.), a braking status, a suspension system status, tire pressure data, etc. The preceding list of internal vehicle input examples is not exhaustive, of course, as others could also be used. Typically, an internal vehicle input is sent from a suitable sensor or other device to controller 99 or to another control module (such as a dedicated suspension control module) via a communications bus or other communications network. This input is evaluated and/or processed by controller 99 to generate an appropriate control command to, for example, the active suspension system.

Figure 4:
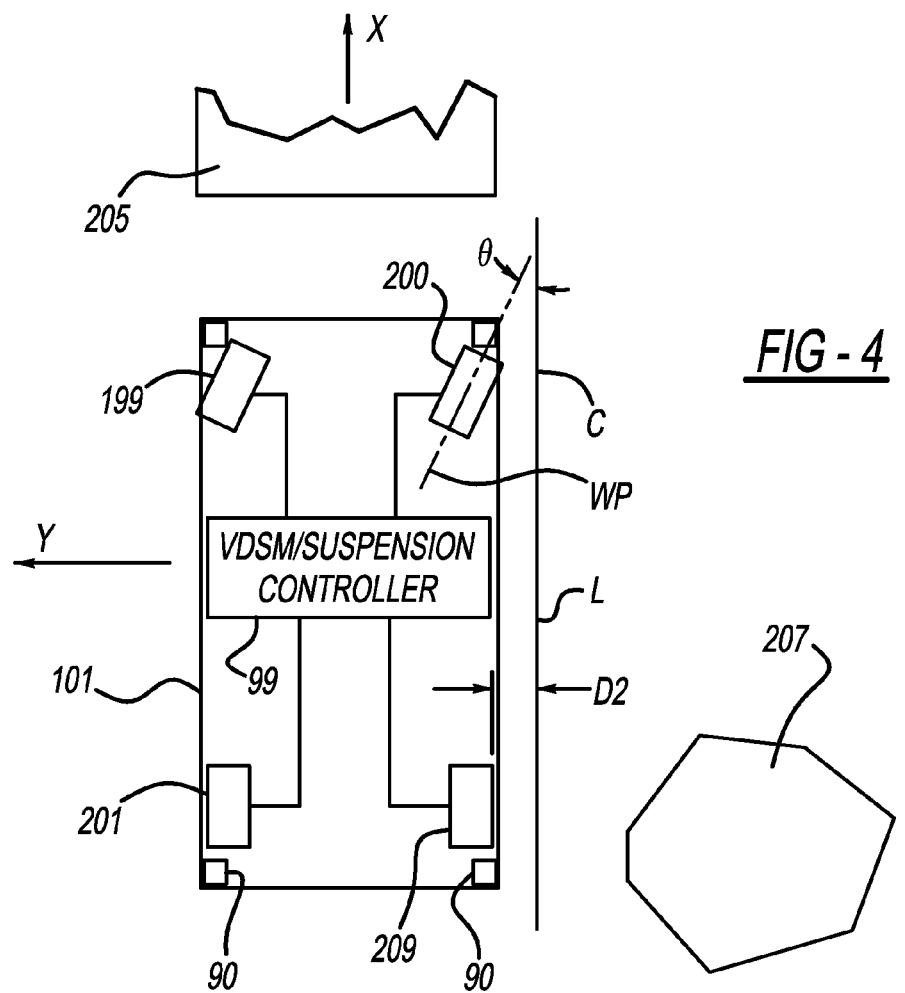
FIG. 4 is a schematic view of a vehicle and an adjacent curb prior to execution of a curb parking maneuver.

In one embodiment, the internal vehicle inputs include data from height sensors mounted on the vehicle and positioned to measure the height of the vehicle above a road surface. In a particular embodiment, as shown in FIG. 4, a height sensor 90 is mounted at each corner of the vehicle 101 proximate an associated vehicle wheel. Each of these sensors is positioned to measure the height of the vehicle above a surface on which the associated wheel resides.

In a particular embodiment, the internal vehicle inputs include data from tire pressure sensors 142 (FIG. 1) configured for measuring the pressure in each tire. This data comprises a measurement of the tire pressure in the tire or information from which the tire pressure can be calculated or estimated. In addition, any of a variety of other internal vehicle inputs may also be utilized by controller 99 in determining the feasibility of a proposed curb parking operation and in facilitating execution of the parking operation, in the manner described herein.

An "external vehicle input" broadly includes any input that pertains to an object, condition, surrounding, environment, etc. that is outside of the vehicle and can be determined by a vehicle-mounted sensor, device, component, module, etc. Some examples of external vehicle inputs include such items as information relating to the vehicle's immediate surroundings (e.g., the distance and speed of nearby vehicles and other objects, etc.) as provided by laser, radar, lidar, lidar or ultrasonic sensors. In one example of such information, one or more of vision, laser, radar, lidar and/or ultrasonic sensors mounted around vehicle 101 sense the presence, position, distance, etc. of nearby vehicles and other objects. This information can be provided to the controller 99 or to another suitable suspension or vehicle height control module in the form of external vehicle information. Other types of external vehicle inputs may also be used.

Figure 5:
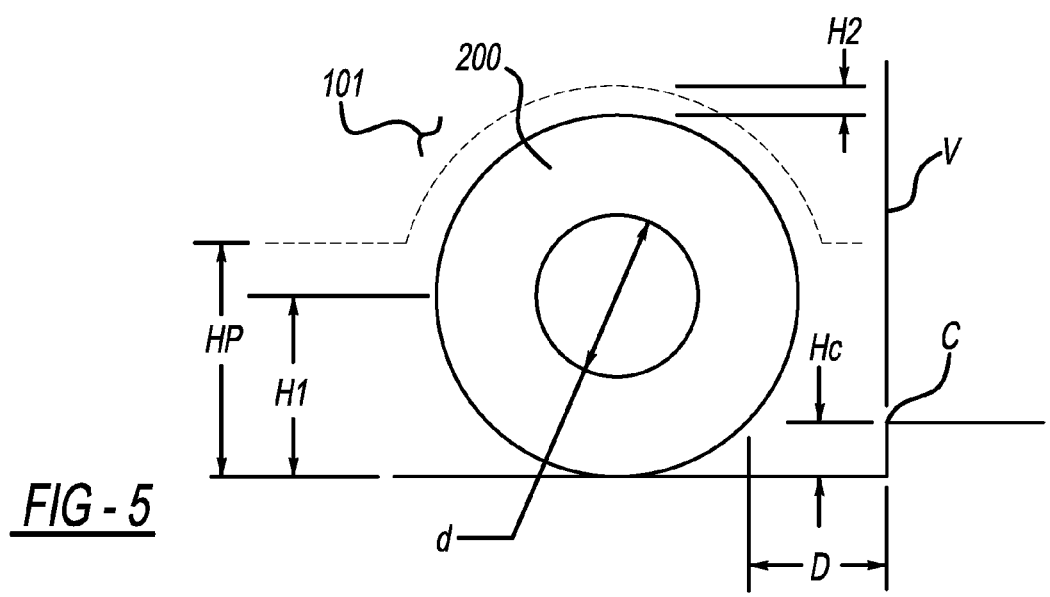
FIG. 5 is a side schematic view of a vehicle wheel and curb shown in FIG. 4.

Referring to FIG. 5, in a particular embodiment, the external vehicle inputs include an estimated or measured height $H_C$ of the curb (on which a portion of the vehicle is to be parked) from the road surface adjacent the curb and/or data from which a curb height estimate may be calculated by controller 99, by a suspension controller, or by another processing means. This height $H_C$ can be estimated or measured using a suitable sensor means (such as a radar or vision system) positioned at an appropriate location on the vehicle. The curb height $H_C$ (in relation to the wheel dimensions) affects the ability of the wheel to climb the curb and the power required to force the wheel up on to the curb.

Referring again to FIGS. 4 and 5, in a particular embodiment, the external vehicle inputs also include an estimated horizontal distance D between the top edge of the curb C and the front wheel 200 nearest the curb, or data from which this distance may be calculated by controller 99, by a suspension controller, or by another processing means. This parameter affects distance wheel must travel to reach the top or level portion of the curb. This distance can be estimated or measured using a suitable sensor means positioned at an appropriate location on the vehicle.

Referring to FIG. 4, in a particular embodiment, the external vehicle inputs include an estimated horizontal distance D2 between the curb C and the rear wheel 209 nearest the curb, or data from which this distance may be calculated by controller 99, by a suspension controller, or by another processing means. This information may be used, in conjunction with dimension D and a manner described below, to generate a representation of a curb line L defining locations of portions of the curb boundary with respect to the vehicle.

In determining if a curb parking operation is feasible, it may be important to first determine a size and configuration of a space envelope adjacent the vehicle (C2). In a particular embodiment, the external vehicle inputs include estimates (or data usable by controller 99 for generating estimates) of the spacings between the vehicle and another vehicle (such as vehicle 205 in FIG. 4), trees (such as tree 207 in FIG. 4) or any other objects in front of the vehicle or along the side of the vehicle closest to the curb. The positions of such external objects relative to the vehicle define the size and configuration of the "envelope" within which the parking maneuver may be executed. More specifically, these distances determine the amount of space available for the vehicle to move both forward and sideways onto the curb during the parking maneuver. These distances between the vehicle and objects residing within a predetermined distance from the vehicle can be estimated or measured using suitable sensor means positioned at appropriate locations on the vehicle, in a manner known in the art. Such data or distance estimates may be obtained from radar sensors, lidar sensors, vision systems or any other suitable sensors positioned along the vehicle to detect such external objects. In addition, any of a variety of other external vehicle inputs may also be utilized by controller 99 in determining the feasibility of a proposed curb parking operation and in facilitating execution of the parking operation, in the manner described herein.

Figure 6:
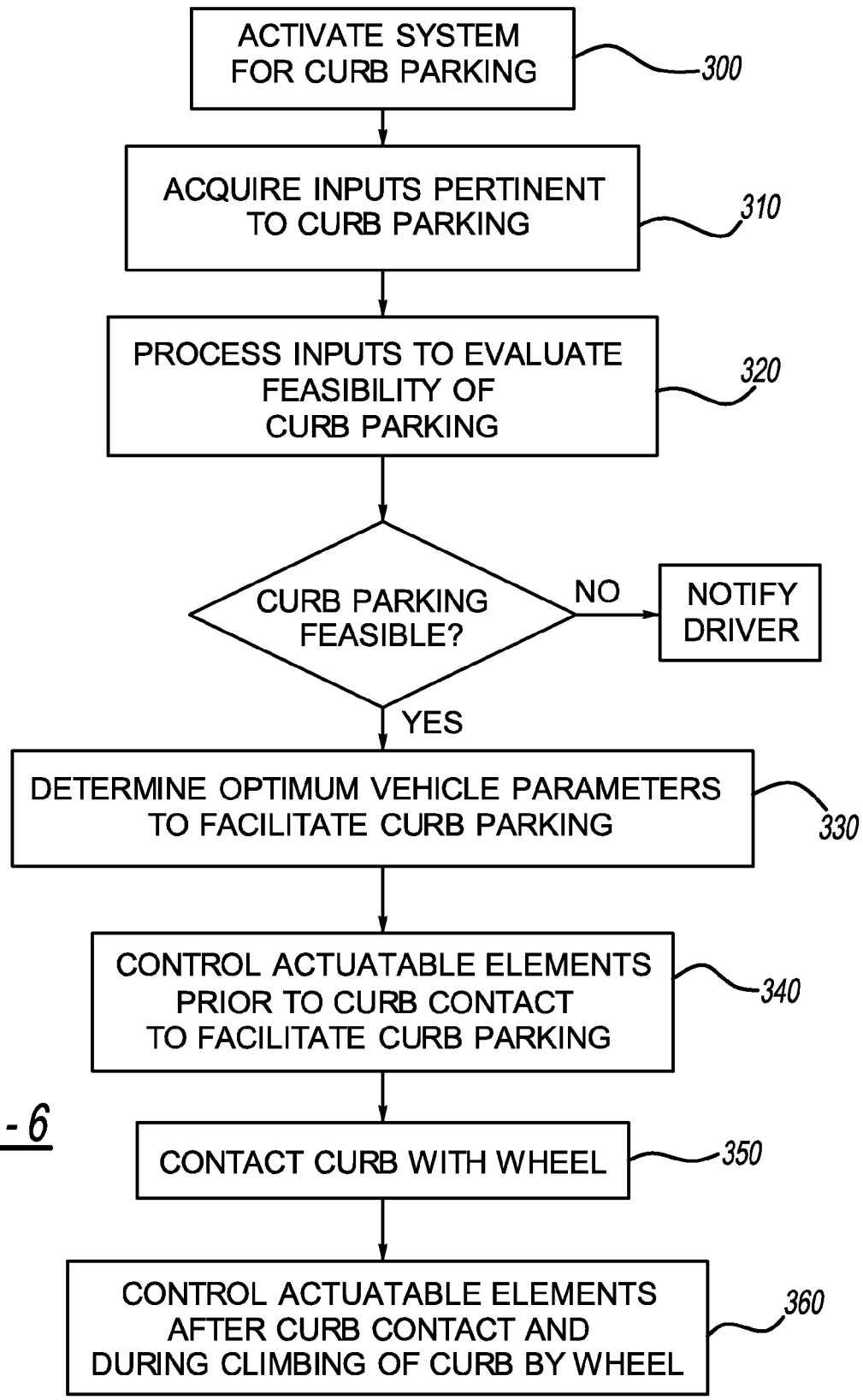
FIG. 6 is a flowchart of a method for controlling an active suspension system in accordance with one embodiment of the present invention.

FIG. 6 illustrates various methods for controlling an active suspension system, such as system 12, to facilitate parking a portion of the vehicle on a curb.

In step 300, the curb parking function is activated by a user, thereby alerting controller 99 that a curb parking maneuver is to be initiated. This may be done using a button or other activation means positioned in the vehicle passenger compartment. This activation may override normal active suspension control and (optionally) other pertinent vehicle controls and/or control protocols for purposes of the parking maneuver. Controller 99 then executes steps and/or protocols designed to determine feasibility of the proposed curb parking operation and, if the parking operation is deemed feasible, facilitate execution of the parking operation. In one particular embodiment, control of the actuatable vehicle elements during the curb parking maneuver is managed by a specialized module or a sub-routine of the main vehicle or suspension control routine. In order for the proposed curb parking operation to be deemed feasible, there must be a space envelope of sufficient size available on the curb to accommodate a portion of the car, and of sufficient size to permit maneuvering of the car onto the available curb space (i.e., there must be sufficient open space adjacent the vehicle and on the curb to permit curb parking and the vehicle maneuvering required to position a portion of the vehicle in a parked position on the curb).

In step 310, the various sensor elements previously described are used to acquire external and internal vehicle inputs pertinent to the feasibility of the proposed curb parking operation. For example, controller 99 receives information enabling calculation of the envelope size available to the vehicle for maneuvering and parking. As one input, the curb height $H_C$ is determined, either remotely (prior to the vehicle contacting the curb) or by contacting the curb with the vehicle wheel.

In one particular embodiment, contact between a vehicle wheel and the curb is detected by detecting a disturbance in suspension force in the wheel in question. In another particular embodiment, contact between a vehicle wheel and the curb is detected by detecting a sudden increase in the resistance of the wheel to drive torque caused by the wheel-curb contact.

In one particular embodiment, the curb height and other pertinent external vehicle inputs are remotely detected (i.e., detected prior to physical contact between the wheel and the curb) by suitably configured and positioned vehicle sensors. Features such as the distances from the vehicle to the curb and other objects surrounding the vehicle and the positions of the curb and other objects in relation to the vehicle can be estimated or measured using suitable sensor means (for example, radar, lidar, etc.) positioned at appropriate locations on the vehicle.

In step 320, various inputs are processed by controller 99 to determine the feasibility of the proposed curb parking operation. For example, the curb height $H_C$ is evaluated using the controller logic to the feasibility of the wheel climbing the curb, given the wheel dimensions, the maximum vehicle height achievable by the active suspension system, and other pertinent factors.

Various other inputs are also gathered to aid in determining (in conjunction with known parameters) the feasibility of parking on the curb. For example, using the wheel dimensions (which are known), the spatial positioning of the curb-detecting sensor(s) relative to the wheel axle (known), the estimated curb height (from sensor data), the maximum vertical travel of the wheel suspension (known), the ratio of curb height to wheel diameter and other pertinent factors, known techniques can be used by the controller to generate an estimate of the portion of the wheel that will contact the curb first, and the distance the wheel must travel to contact the curb (assuming that the base of the curb does not extend out far enough to contact the wheel prior to the top of the curb contacting the wheel). Such information can also be used by the controller to calculate whether it is feasible for the vehicle wheel in question to attempt to climb the curb. For cases where, under a given set of parking conditions, it is impractical or undesirable for the wheel to attempt to climb the curb at the location in question, the system may be configured to alert an operator of the vehicle to this condition. Appropriate data structures such as databases, look-up tables, arrays, algorithms, etc. may be maintained and/or used by the controller to determine if the curb height $H_C$ is too great for the vehicle to park on the curb without potential damage to the vehicle. If the curb height is found to be too great, the driver may be alerted via an indicator light or other suitable means.

In step 330, when it is determined that the proposed curb parking operation is feasible, controller 99 determines optimum actuatable element parameters for the curb parking operation, for use in controlling parking-related actuatable elements of the vehicle. For example, in one embodiment, the controller uses the various inputs to calculate an optimum angle of approach θ for the front or rear wheel to aid in preventing wheel and tire damage during curb parking. If it is assumed that the curb C is straight along the portion of the curb where the vehicle is to be parked, these distances can be used to generate an estimation or representation of a line L defining the curb boundary. As used herein, the term "wheel plane" refers to a vertical plane passing through the center of a vehicle wheel and extending in the direction in which the wheel is pointing. An example of a wheel plane is plane WP shown in FIG. 4. Thus, the controller may be configured to detect and indicate when a predetermined angle between a vertical plane passing through a center of a vehicle wheel and extending in the direction in which the wheel is pointing, and a line defining a curb adjacent the wheel, has been achieved. Referring to FIG. 4, the position and distance information may be used by the controller 99 or another suitable suspension controller to calculate an angle θ (termed herein the "angle of approach") formed by an intersection of the wheel plane WP with a vertical plane V (FIG. 5) passing through the curb line L. This angle may be varied by simply turning the steering wheel, thereby altering the orientation of the wheel plane WP. In an instance where a rear wheel is approaching the curb, turning the steering wheel may also adjust the angle θ between the rear wheel plane WP and the vertical plane V, by re-directing the vehicle.

In one embodiment, the angle θ is maintained at a value of at least 15 degrees. It has been found that, as the angle θ falls below 15 degrees, the side of the wheel closest to the curb will tend to scrape excessively along the curb prior to and/or during the climbing operation, possibly damaging the wheel. Another factor affecting the angle of approach θ is the space available for the vehicle to move forward during the parking maneuver. As the angle of approach decreases, more space is required ahead of the vehicle for the parking maneuver. However, in situations where there is a relatively small space ahead of the vehicle and on the curb, the vehicle must move more sideways (i.e., with a greater component along the vehicle "Y" axis) than forward during the parking maneuver. As the angle θ increases, the vehicle moves more sideways than forward during the parking maneuver, thereby requiring relatively less space ahead of the vehicle.

Using the wheel dimensions (known), the estimated curb height (measured or calculated from sensor data), and the estimated size envelope into which the vehicle may be inserted during parking (measured or calculated from sensor data) as inputs, the distances of the vehicle corners from the curb and other pertinent factors, an optimum approach angle $\theta_{OPT}$ for a given set of parking parameters can be calculated by the controller or by a suspension control module. This approach angle can be conveyed to the driver, who may then align the front or rear wheel direction with respect to the curb line L to achieve the optimum approach angle $\theta_{OPT}$. In addition, indicating means may be provided in the vehicle passenger compartment and coupled to the steering wheel sensor and controller provided for transmitting feedback to the driver during the parking process, to aid the driver in maintaining the optimum approach angle until the wheel has finished climbing the curb. Appropriate data structures such as databases, look-up tables, arrays, algorithms, etc. may be maintained and/or used by the controller in determining the optimum angle of approach for a given set of parking conditions.

In a particular embodiment, the vehicle incorporates a controller-augmented steering system capable of automatically implementing of the optimum approach angle $\theta_{OPT}$. In this system, commands from the controller adjust the steering wheel angle so as to achieve and maintain the desired angle $\theta_{OPT}$ during curb parking. The controller may also be operatively coupled to the vehicle engine (or to an engine controller) to enable the tire pressure information to be used to control the power generated by the engine during the curb parking maneuver, to aid in maintaining the tire pressure within the desired range. In addition, this automatic control mode enables the angle $\theta_{OPT}$ to be dynamically adjusted, to aid in maintaining the tire pressure within the desired range. For example, it may be desirable to automatically and continuously adjust the steering angle responsive to the tire pressure such that the tire approach the curb head-on to reduce the risk of scraping the side wall of a tire. Alternatively, the vehicle control system may be configured to provide tactile feedback to the driver during the curb parking operation. For example, the current vehicle position as well as the desired trajectory required to accomplish the parking task may be calculated by utilizing vehicle position measurements. The power steering's required effort to maneuver the vehicle is altered thus providing feedback to the vehicle operator. The required effort is decreased when it is determined that the operator is steering the vehicle within the desired trajectory, and the required effort is increased when it is determined that the operator is steering the vehicle outside the desired trajectory. The operator can feel increases and decreases in steering effort at the steering wheel giving the operator assurance that he is in control. U.S. Pat. No. 5,742,141 (which is incorporated herein by reference in its entirety) discloses autonomous and semi-autonomous parking systems as described above, including elements, sub-systems and/or methods which may be incorporated into the embodiments of the present invention.

In one particular embodiment, the vehicle incorporates a known active steering system 900 (FIG. 1). As is known in the art, the controller controlling the active steering system issues commands varying the steering ratio according to driving conditions in order to improve handling performance and directional stability of the vehicle. When the vehicle is moving at relatively higher speeds, the steering ratio is increased to lessen the response at the higher speeds, thereby enhancing vehicle control. In the embodiments of the present invention, the active steering system may be controlled so as to aid the driver in achieving and maintaining the desired approach angle during turning of the steering wheel. For example, the steering ratio may be increased to enable more precise control of the vehicle wheel direction by a user when attempting to maintain an optimum angle of approach during the curb parking maneuver. In a parking scenario, the steering ratio may be adjusted so that fewer turns are required to move the front wheels lock to lock.

In step 340, in preparation for the curb parking operation, the controller controls the various elements (for example, actuatable elements of the active suspension system) to achieve the calculated optimum parameters, so as to facilitate the curb parking operation. For example, actuatable elements of the vehicle may be controlled so as to adjust heights of portions of the vehicle during the curb parking operation. In one embodiment, it may desirable to raise the height of the vehicle (or one or more portions of the vehicle) prior to contact with the curb.

In one embodiment, prior to either a front or a rear wheel ascending the curb, the controller receives data relating to an initial height H1 of the vehicle body above the road surface close to the front wheel about to ascend the curb. The controller also receives data relating to curb height $H_C$ from one or more suitably positioned and configured sensors, as previously described.

Referring to FIG. 5, in one mode of operation, prior to the vehicle climbing the curb, the entire vehicle body (i.e., at all four corners proximate the wheel locations) is adjusted by the active suspension system (or another vehicle system suitable for controlling the height of the vehicle from the ground) and/or the vehicle height control system to a height of $H_p$ above the street or the surface on which the wheel rests. In one particular mode of operation, $H_p$ is at least equal to $(H_{MIN} + H_C)$, where $H_{MIN}$=the minimum or lowest vehicle height above the road surface attainable by the active suspension system or height control system, and $H_C$=the curb height as measured or estimated from sensor data In another particular mode of operation, $H_p = H_{MAX}$, the maximum or greatest vehicle height above the road surface attainable by the active suspension system or height control system. In another particular embodiment, only the vehicle corner proximate the front wheel or rear wheel closest to the curb (i.e., the first wheel intended to climb the curb during the parking operation) is raised to a height of $H_p$ prior to climbing the curb. Increasing the height of the vehicle or the portion of the vehicle to be parked provides the "slack" or space in the suspension system enabling the wheel ascending the curb to rise in a controlled manner toward the vehicle body during climbing of the curb and responsive to pressure exerted by the curb on the wheel, in a manner described below. Raising the height of the entire vehicle prior to the wheels climbing the curb aids in maintaining the vehicle in a level state during the curb parking operation. The system may be configured to provide feedback from the sensor elements and/or actuatable elements to the controller 99, for use in dynamically adjusting the control commands to the actuatable elements during the parking operation.

In one particular control mode, the suspension system at the vehicle wheels is divided into two control zones. One control zone comprises a wheel projected to ascend the curb first during the curb parking operation (for example, wheel 200 in FIG. 4) and the wheel located diagonally from the first wheel (wheel 201 in FIG. 4). A second control zone comprises the remaining wheels located diagonally with respect to each other (wheels 199 and 209 in FIG. 4). Just prior to the first wheel ascending the curb, the heights of the portions of the vehicle at the wheels of the second control zone (wheels 199 and 209 of FIG. 4) are raised by extending the respective wheels downward. As a result, the contact forces between the wheels in the first control zone and the ground are reduced during curb climbing, thereby facilitating climbing of the curb. Reducing the contact forces between the ground and the first wheel during curb climbing as described also reduces the suspension system forces required to raise the first wheel during curb ascent. This reduces the intensity of the suspension system actuations required to raise the wheel, which aids in minimizing the effects of suspension system elements actuations on vehicle occupants. In addition, this control mode helps reduce the power and bandwidth requirements for the actuator.

In a particular control mode, the vehicle steering may be configured such that the vehicle wheels are permitted to turn through greater angles than allowable when the vehicle height is lower, when the vehicle height has been raised to a value at or near the maximum level achievable by the vehicle height control system. In a particular embodiment, the vehicle height is raised to a height within 10% or less of the maximum height achievable by a system controlling the vehicle height. When the vehicle height resides within this range, the turning angles of the front wheels (for example, 199 and 200 shown in FIG. 4) may be increased. The steering may be structured for greater wheel rotation in vehicle designs where the steering angle is limited by packaging issues at lower vehicle heights, but need not be so limited when the vehicle height is raised. For example, if the vehicle's steering cannot turn more than 25 degrees in either direction due to packaging issues, by raising the ride height, for example, by 6 inches, additional clearance may be provided for the steering mechanism to turn, for example, up to 30 degrees in either direction. Thus, subsequent to raising the vehicle height, the turning angles of the front wheels may be increased prior to a front wheel contacting the curb. This would then allow for a significant decrease in turning radius during the curb parking maneuver. In one embodiment, the height of the entire vehicle is raised to a predetermined height prior to contacting the curb. In a particular embodiment, the vehicle height is raised to a distance $H_2$ above the wheel of more than 2% of the wheel diameter d, by the system controlling the vehicle height.

In step 350, wheel 200 (i.e., the first wheel to climb the curb) makes contact with curb C.

In step 360, after the wheel 200 contacts curb C and before the wheel begins to climb the curb, a mode of control of the active suspension system is adjusted to provide a desired response while the wheel is climbing the curb.

In one control mode, when the wheel 200 contacts the curb C and prior to climbing the curb, the controller receives tire pressure data from one or more tire pressure sensors mounted to the wheel or in operative communication with the wheel. The contact between the wheel and the curb produces an elevated tire pressure condition which is detected by the sensor and transmitted to the VDCM or suspension controller. This elevated pressure condition would normally persist while the tire climbs the curb. Upon notification of the elevated tire pressure condition, the VDCM or suspension controller sends a control signal to the suspension and/or height control elements at the wheel in question. This control signal causes the suspension to raise the wheel toward the vehicle as the wheel climbs the curb. The tire pressure reading is used to determine and adjust the rate at which the wheel is raised, in correlation with the rate at which the wheel is climbing the curb such that, while the wheel is ascending the curb, the tire pressure is maintained at a value within a predetermined range. Thus, the wheel is raised responsive to a tire pressure of the wheel while the wheel is ascending the curb, and so as to maintain the tire pressure at a value within a predetermined range. In one embodiment, the predetermined range is the normal range of tire pressure experienced when the tire rests on a level road surface. The controller receives an ongoing stream of data form the tire pressure sensor and generates an ongoing series of control commands to control the suspension at the wheel in the manner described, to maintain the tire pressure within the predetermined range as the wheel climbs the curb.

The wheel is raised toward the vehicle until the vehicle height sensor located proximate the wheel indicates that the vehicle height above the curb at the raised wheel is $H_p$–$H_C$. In an embodiment where the entire vehicle was set to a height $H_p$ prior to the first wheel ascending the curb, because the wheel is raised gradually responsive to the climbing motion, the vehicle can be maintained in a substantially level state while the wheel ascends the curd, and should be level or substantially level when the wheel has reaches to top of the curb. The resulting reduction in suspension forces also aids in reducing the intensity of vehicle body motion and disturbances to vehicle occupants. This operation also maintains vehicle support at the corner of the vehicle where the wheel is climbing the curb, aids in reducing the risk of wheel damage due to contact with the curb.

Figure 7A:
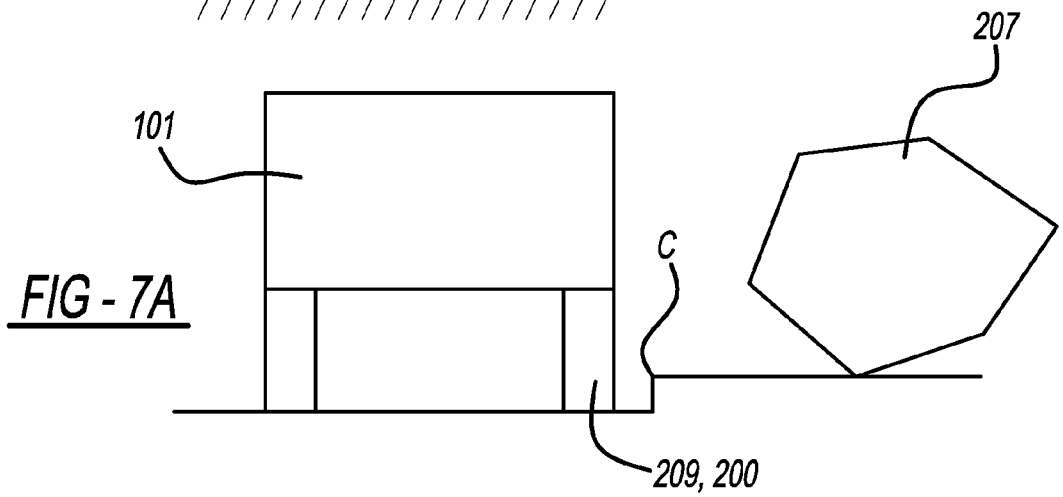
FIG. 7A is a schematic view from the rear of a vehicle adjacent a curb prior to execution of a curb parking operation.
Figure 7B:
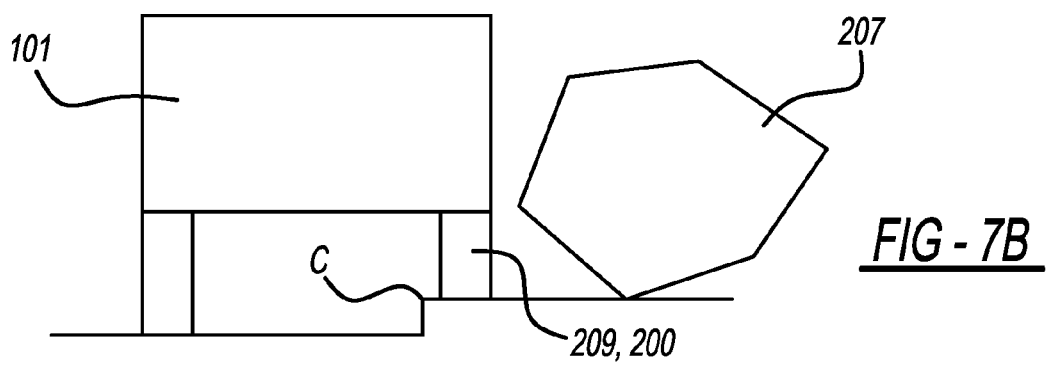
FIG. 7B is the view of FIG. 7A of the vehicle adjacent the curb after execution of a curb parking operation.

In step 370, wheel 200 proceeds to climb to the top of curb C. Steps 340-370 may then be repeated for the second wheel (for example, the rear vehicle wheel 209 closest to the curb). FIG. 7A shows the vehicle adjacent curb C prior to the curb parking maneuver. FIG. 7B shows the vehicle adjacent curb C after completion of the curb parking maneuver.

In another control mode, step 320 is omitted from the sequence, and the curb is not detected remotely, but rather by contact with the wheel. In this embodiment, the optimum approach angle $\theta_{OPT}$ is not calculated prior to contact between the wheel and the curb. However, the tire pressure changes resulting from contact between the wheel and the curb may be used as previously described to provide feedback during manual or automatic adjustment of the wheel angle.

For example, the vehicle may incorporate means (operatively coupled to the vehicle transmission, for example) permitting the controller to stop forward motion of the vehicle when the wheel contacts the curb. Then, for manual adjustment of the wheel, an indicator means may be provided to inform a driver turning the wheel which direction to turn the wheel to achieve the desired approach angle and/or when the optimum approach angle $\theta_{OPT}$ has been achieved, at which time the controller releases the vehicle, enabling the vehicle to proceed with the curb parking maneuver.

In other embodiments, other vehicle parameters in addition to (or as an alternative to) tire pressure may be input to controller 99 for use in formulating suspension control commands.

In a particular embodiment, controller 99 is operatively coupled to elements of the vehicle (for example, the transmission and/or the engine) to enable the controller to halt motion of the vehicle in a given direction if, during motion in that direction, the vehicle approaches to within a predetermined distance of an external object. This aids in preventing inadvertent collision with such objects during parking.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A method for controlling an active suspension system of a vehicle during a curb parking operation, so as to position a portion of the vehicle on a street and a portion of the vehicle on a curb, comprising steps of:
   activating a curb parking function of the active suspension system;
   acquiring inputs pertinent to the curb parking operation;
   determining, by a controller, if a curb parking operation is feasible for the vehicle;
   if a curb parking operation is deemed infeasible, notifying an operator of the vehicle that the curb parking operation is infeasible; and
   if a curb parking operation is deemed feasible, controlling actuatable elements of the active suspension system to facilitate curb parking.

2. The method of claim 1 wherein the step of determining if a curb parking operation is feasible comprises the step of determining a size and configuration of a space envelope adjacent the vehicle.

3. The method of claim 1 wherein the step of determining if a curb parking operation is feasible comprises the step of determining a height of the curb on which the vehicle is to be parked.

4. The method of claim 3 wherein the step of determining the height of the curb comprises the step of contacting the curb with a vehicle wheel.

5. The method of claim 3 wherein the step of determining the height of the curb comprises the step of detecting the curb prior to the vehicle contacting the curb.

6. The method of claim 1 wherein the step of controlling actuatable elements of the active suspension system comprises the step of calculating optimum values of vehicle parameters needed to facilitate the curb parking operation.

7. The method of claim 6 wherein the step of calculating optimum values of various vehicle parameters comprises calculating an angle of approach of the vehicle wheel toward the curb.

8. The method of claim 7 wherein the step of controlling actuatable elements of the active suspension system comprises the step of, after calculating the angle of approach of the vehicle wheel toward the curb, implementing and maintaining the angle of approach as the vehicle wheel climbs the curb.

9. The method of claim 1 wherein the step of controlling actuatable elements of the active suspension system comprises the step of controlling the actuatable elements so as to adjust heights of portions of the vehicle during the curb parking operation.

10. The method of claim 9 wherein the step of controlling the actuatable elements so as to adjust heights of portions of the vehicle during the curb parking operation comprises the step of raising a height of at least a portion of the vehicle prior to contacting the curb.

11. The method of claim 10 wherein the step of raising a height of at least a portion of the vehicle prior to contacting the curb comprises the step of raising a height of a vehicle corner proximate a wheel closest to the curb to a predetermined height prior to climbing the curb.

12. The method of claim 10 wherein the step of raising the height of at least a portion of the vehicle comprises the step of raising the height of at least a portion of the vehicle such that a distance of the at least a portion of the vehicle above the wheel is more than 2% of the wheel diameter.

13. The method of claim 10 wherein the step of raising the height of at least a portion of the vehicle prior to contacting the curb comprises the step of raising the height of the vehicle to a predetermined height prior to contacting the curb.

14. The method of claim 13 wherein the step of raising the height of the vehicle to a predetermined height comprises the step of raising the height of the vehicle to a height $H_p$ equal to at least $(H_{MIN}+H_C)$, where $H_{MIN}$ is a minimum or lowest vehicle height above a road surface attainable by the active suspension system, and Hc is equal to an estimated height of the curb.

15. The method of claim 13 wherein the step of raising the height of the vehicle to a predetermined height comprises the step of raising the height of the vehicle to a height equal to a maximum vehicle height above a road surface attainable by the active suspension system.

16. The method of claim 10 further comprising the step of, subsequent to the step of raising the height of at least a portion of the vehicle, increasing turning angles of front wheels of the vehicle prior to a front wheel contacting the curb.

17. The method of claim 10 wherein the step of raising a height of at least a portion of the vehicle prior to contacting the curb comprises the step of raising a height of a vehicle corner proximate a wheel closest to the curb to a predetermined height prior to climbing the curb.

18. The method of claim 1 wherein a first control zone comprises a first vehicle wheel projected to ascend the curb first during the curb parking operation, and a second vehicle wheel located diagonally from the first vehicle wheel,
a second control zone comprises third and fourth remaining vehicle wheels located diagonally with respect to each other, and wherein the step of controlling actuatable elements of the active suspension system comprises the step of, prior to a vehicle wheel ascending the curb, controlling the actuatable elements so as to raise heights of portions of the vehicle proximate the third and fourth remaining vehicle wheels of the second control zone.

19. The method of claim 1 wherein the step of controlling actuatable elements of the active suspension system comprises the step of controlling actuatable elements responsible for raising a first vehicle wheel to ascend the curb, to raise the first vehicle wheel responsive to a tire pressure of the first vehicle wheel while the first vehicle wheel is ascending the curb and so as to maintain the tire pressure of the first vehicle wheel at a value within a predetermined range.

20. The method of claim 1 wherein the step of controlling actuatable elements of the active suspension system comprises the steps of:
prior to a vehicle wheel ascending the curb, raising a height of the vehicle to an initial height $H_p$ above a surface on which the vehicle wheel rests; and
during the vehicle wheel ascending the curb, raising the vehicle wheel toward the vehicle until the vehicle height above the curb at the raised wheel is equal to $H_p$-$H_c$, where $H_c$ is equal to a height of the curb.

* * * * *